Jan. 27, 1959 B. R. STACHIEWICZ 2,871,295
AUTOMATIC FREQUENCY CORRECTION IN SUPPRESSED CARRIER COMMUNICATION SYSTEMS
Filed Oct. 29, 1956
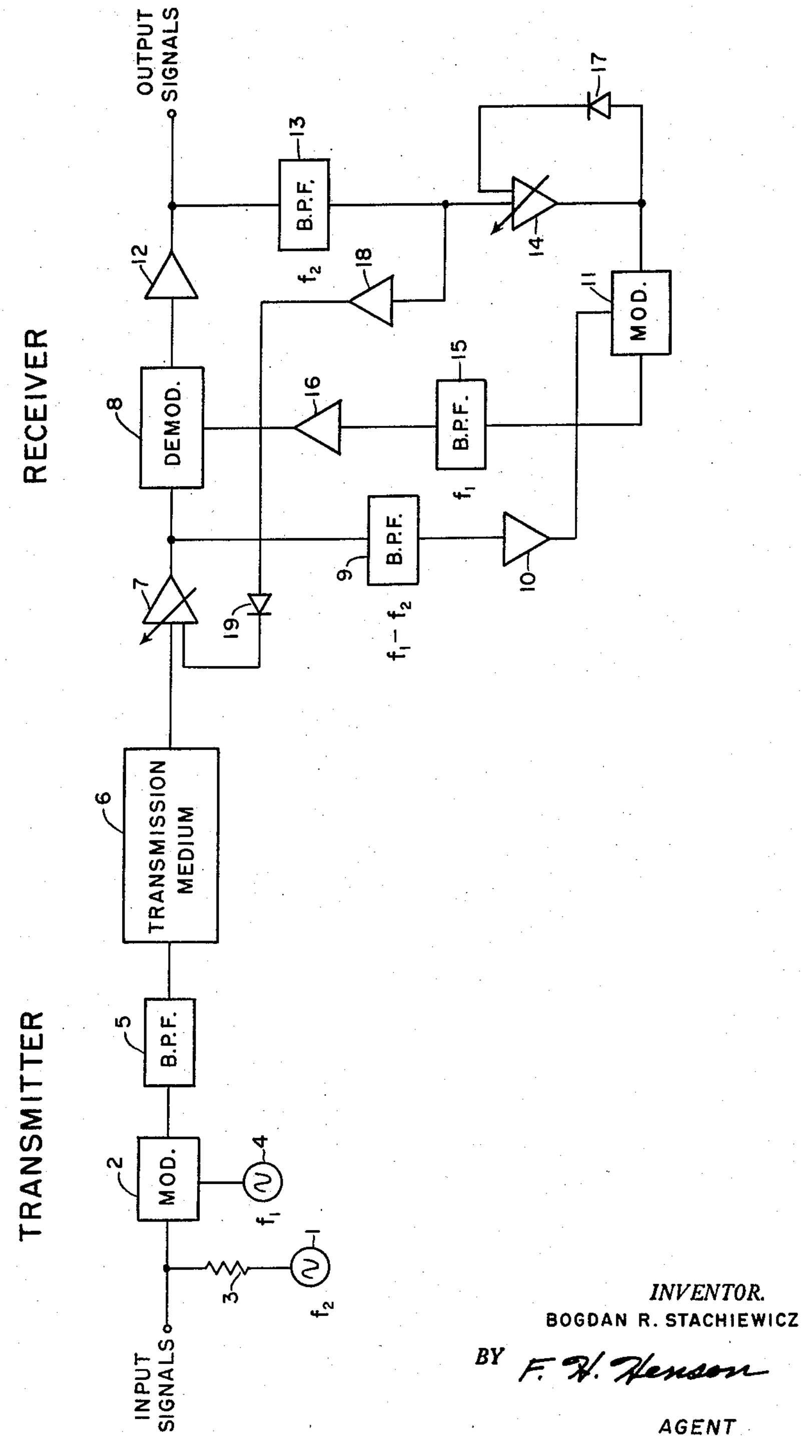
INVENTOR.
BOGDAN R. STACHIEWICZ
BY F. H. Henson
AGENT 2,871,295
Patented Jan. 27, 1959

2,871,295

AUTOMATIC FREQUENCY CORRECTION IN SUPPRESSED CARRIER COMMUNICATION SYSTEMS

Bogdan R. Stachiewicz, Rochester, N. Y., assignor to General Dynamics Corporation, Rochester, N. Y., a corporation of Delaware Application October 29, 1956, Serial No. 619,060

6 Claims. (Cl. 179—15.5)

This invention relates in general to communication systems and, more particularly, to automatic frequency correction in communication systems in which the transmitting and receiving terminals are interconnected by a transmission medium which tends to introduce frequency errors in signals transmitted therethrough.

The frequency correction circuit, which forms the subject matter of this invention, finds use in any type of communication system which is subject to frequency distortion. For example, the frequency correction circuit herein disclosed is also shown and described in conjunction with a two-way two-wire carrier system in my copending application Serial No. 619,059, filed October 29, 1956, and assigned to the same assignee as the present invention. In the system disclosed in the above-identified copending application, the carrier terminals are interconnected by a transmission line which includes frequency frogging, or band inverting, repeaters which tend to introduce frequency errors in the transmitted signals. The disclosed invention also finds use in cable systems where a great number of repeaters, spaced at small intervals, are required, and in high frequency or microwave radio systems regardless of the type of modulation used. There are also possible applications of the invention in the field of radio astronomy where changes of frequency due to doppler effect can be encountered.

When signals are transmitted through a transmission medium which tends to introduce frequency errors, a distorted reproduction of the signals may be produced at the receiving terminal if a local oscillator is used at the receiving terminal for demodulation. It is desirable, therefore, to obtain the demodulating frequency at the receiving terminal from a pilot signal, or signals, transmitted from the transmitting terminal. Since the pilot signal, or signals, utilized to derive the demodulating frequency are subject to the same frequency distortion as the transmitted sideband, or sidebands, the errors cancel out when the sideband is demodulated and an accurate reproduction of the transmitted signals is obtained.

It is the general object of this invention to provide a new and improved suppressed carrier communication system.

It is a more particular object of this invention to provide new and improved frequency correction circuitry to assure that an accurate reproduction of transmitted signals is produced at the receiving terminal in a suppressed carrier communication system.

In accordance with the present invention, a carrier wave for demodulating the received sideband is produced from a single received pilot signal without utilizing a local oscillator at the receiving terminal. This is accomplished by providing a band-pass filter, which is sharply tuned to the difference frequency of the pilot frequency and the carrier suppressed at the transmitting terminal, and which is connected between the output of the demodulator and the input of a modulator at the receiving terminal. The received pilot signal is modulated in the modulator with the signal passed by the filter to produce the demodulating carrier wave. Thus, the produced carrier wave has a frequency value equal to the frequency of the suppressed carrier frequency at the transmitting terminal plus any error introduced in the pilot signal in traversing the transmission medium.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows a block diagram of a transmitter and a receiver interconnected by a transmission medium.

As illustrated, oscillator 1 generates a frequency $f2$ which is coupled to the input of modulator 2 through resistor 3. Preferably, the frequency generated by oscillator 1 lies within the frequency band of the input signals which are also coupled to the input of modulator 2. That is, if the input signals comprise a voice band of 0–4 kc., frequency $f2$ is preferably in the order of 3 or 3.5 kc. If modulator 2 is a group modulator and the input signals comprise a group band of frequencies, for example, 12–28 megacycles, frequency $f2$ is preferably near the center frequency of the band, or 20 megacycles. Oscillator 4 generates the carrier wave $f1$ which is modulated in transmitting modulator 2 with the input signals and frequency $f2$. Modulator 2 is of the balanced type so that carrier frequency $f1$ is suppressed in the modulator. One of the resulting sidebands, either the upper or lower, is selected by band-pass filter 5 and applied to the transmission medium. If it be assumed that filter 5 selects the lower sideband, the transmitted sideband includes a pilot signal having a frequency of $f1-f2$. The signal transmitted from the transmitting terminal may be radiated from a suitable antenna or may be transmitted over open wires or cable to the receiver and the transmission medium may include repeaters or other frequency distorting elements.

At the receiver, the received sideband of signals is applied to the input of variable gain amplifier 7 and the amplified signals appearing in the output of said amplifier are applied to the input of balanced demodulator 8. Also, the amplified pilot frequency of $f1-f2$ appearing in the output of amplifier 7 is picked off by band-pass filter 9, amplified by amplifier 10, and applied as a carrier wave to the modulator 11. It will be noted that signals appearing in the output of demodulator 8 are amplified by amplifier 12 and applied to the terminal designated as output signals. Also, signals of frequency $f2$ appearing in the output of amplifier 12 are picked off by band-pass filter 13, amplified in variable gain amplifier 14, and applied to the input of balanced modulator 11.

Band-pass filter 13 must be sharply tuned to the frequency $f2$ and is preferably of the crystal filter type. When power is first applied to the circuit, the operation of this portion of the system is initiated by a transient. The pilot frequency of $f1-f2$ plus any frequency error introduced in that signal acting as carrier for modulator 11 is modulated with the $f2$ signal passed by filter 13 and amplified by amplifier 14 to produce a frequency $f1$ plus error at the output of modulator 11. The frequency $f1$ plus error is passed by band-pass filter 15, amplified by amplifier 16 and applied as a carrier wave to balanced demodulator 8. The carrier wave of $f1$ plus error is, of course, modulated with the pilot frequency of $f1-f2$ plus error in demodulator 8 to produce a signal of frequency $f2$ without error which is, in turn, passed by filter 13. Thus, it can be seen that the operation is of the closed ring type and, once started, is self-sustaining.

To further explain the operation of this portion of the circuit, it will be noted that the output of variable gain amplifier 14 is rectified by rectifier 17 and applied to the input of amplifier 14 for the purpose of adjusting the gain of said amplifier. When power is first applied to the circuit, the gain of amplifier 14 is at a maximum. Since the over-all gain at this time through the closed ring just described is much greater than when the operation is stabilized, the circuit tends toward oscillation at frequency $f2$. As the level of signal $f2$ increases, the gain of amplifier 14 is, of course, reduced.

It will now be apparent that since frequency $f1$ plus error is utilized to demodulate the received sideband plus error, an accurate reproduction of the transmitted input signals is produced at the output of demodulator 8. Also, the $f2$ signal passed by filter 13 is amplified by amplifier 18, rectified by rectifier 19, and applied to the input of amplifier 7 to adjust the gain of said amplifier. Amplifier 7 and the automatic gain control circuit may be of any well known type. The signal appearing at the output of rectifier 19 may also be used to actuate a loss of pilot alarm circuit in any well known manner.

It will also be apparent that oscillator 4 may drift in frequency without shifting the frequency of the output signals at the receiver. Of course, the amount of frequency drift which can be tolerated is determined by the requirements of the band-pass filters used in the system. To illustrate this feature of the invention, assume that oscillator 4 has an output frequency of $f1$ plus the error $E1$. Under these conditions, the pilot signal transmitted has a frequency of $f1+E1-f2$. At the receiver, $f1+E1-f2$ is modulated in modulator 11 with the signal of frequency $f2$ passed by filter 13 to produce a demodulated carrier wave of frequency $f1+E1$. Since the sideband of signals received includes the error $E1$, the errors cancel in demodulator 8 and the output signals appearing at the output of demodulator 8 are an exact reproduction of the input signals at the transmitter.

The system has been illustrated for the condition of transmitting the lower sideband produced in modulator 2. If the upper sideband is selected by band-pass filter 5, band-pass filter 9 at the receiver must be designed to select the resulting pilot frequency of $f1+f2$. Also, band-pass filter 15 at the receiver would then pass the lower sideband of the pilot frequency modulated with $f2$ appearing in the output of modulator 11. Under these conditions, the demodulated carrier wave passed by filter 15 has a frequency of $f1+f2-f2$, or $f1$.

While there has been shown and described what is considered at present to be the preferred embodiment of the invention, modifications thereto will readily occur to those skilled in the art. It is not, therefore, desired that the invention be limited to the specific arrangement shown and described and it is intended to cover in the appended claims all such modifications as fall within the true spirit and scope of the invention.

What is claimed is:

1. In a communication system comprising a transmitting terminal and a receiving terminal, a source of input signals which lie within a given frequency range, means at said transmitting terminal for modulating a carrier wave with said input signals and for suppressing the carrier frequency, means at said transmitting terminal for generating a pilot signal which differs in frequency from said carrier wave by a particular frequency within said given frequency range, means at said transmitting terminal for transmitting one of the sidebands of said modulated carrier wave and said pilot signal to said receiving terminal, said receiving terminal comprising a demodulator having an input circuit and an output circuit, means for applying the received signals to the input circuit of said demodulator, a band-pass filter tuned to said particular frequency and connected to the output circuit of said demodulator, means for modulating the received pilot signal with the signal passed by said filter to derive a carrier wave, and means for applying said derived carrier wave to said demodulator to demodulate the received sideband.

2. In a communication system comprising a transmitting terminal and a receiving terminal interconnected by a transmission medium which tends to introduce frequency errors in signals transmitted therethrough, a source of input signals which lie within a given frequency range, means at said transmitting terminal for modulating a carrier wave with said input signals and for suppressing the carrier frequency, means at said transmitting terminal for generating a pilot signal which differs in frequency from said carrier wave by a particular frequency within said given range, means at said transmitting terminal for transmitting one of the sidebands of said modulated carrier wave and said pilot signal through said transmission medium to said receiving terminal, said receiving terminal comprising a demodulator having an input circuit and an output circuit, means for applying the received signals to the input circuit of said demodulator, a band-pass filter tuned to said particular frequency and connected to the output circuit of said demodulator, means for modulating the received pilot signal with the signal passed by said filter to derive a carrier wave having a frequency equal to the suppressed carrier frequency plus the frequency error introduced in said pilot signal, and means for applying the derived carrier wave to said demodulator to demodulate the received sideband.

3. In a communication system comprising a first and second carrier terminals, means at said first terminal for generating a first signal of a first frequency, a source of input signals, means at said first terminal for amplitude modulating a carrier wave of a second frequency with said input signals and with said first signal and for suppressing the carrier frequency, means for transmitting at least one of the sidebands of said modulated carrier wave to said second terminal, said second terminal comprising a demodulator having an input circuit and an output circuit, means for applying the received sideband to the input of said demodulator, a band-pass filter tuned to said first frequency and connected to the output of said demodulator, means for modulating the received signal within said sideband which corresponds to said first signal with the signal passed by said band-pass filter to derive a carrier wave of said second frequency, and means for applying said carrier wave to said demodulator to demodulate said sideband.

4. In a communication system comprising first and second carrier terminals interconnected by a transmission medium which tends to introduce frequency errors in signals transmitted therethrough, means at said first terminal for generating a first signal of a first frequency, a source of input signals, means at said first terminal for amplitude modulating a carrier wave of a second frequency with said input signals and with said first signal for suppressing the carrier frequency, means for transmitting at least one of the sidebands of said modulated carrier wave through said transmission medium to said second terminal, said second terminal comprising a demodulator having an input circuit and an output circuit, means for applying the received sideband to the input circuit of said demodulator, a band-pass filter tuned to said first frequency and connected to the output circuit of said demodulator, means for modulating the received signal within said sideband which corresponds to said first signal with the signal passed by said band-pass filter to derive a carrier wave having a frequency equal to said second frequency plus the frequency error introduced in the signal which corresponds to said first signal, and means for applying said carrier wave to said demodulator to demodulate the received sideband.

5. In a communication system comprising first and second carrier terminals, means at said first terminal for generating a first signal of a first frequency, a source of input signals, means at said first terminal for amplitude modulating a carrier wave of a second frequency with said input signals and with said first signal and for suppressing the carrier frequency, means for transmitting at least one of the sidebands of said modulated carrier wave to said second terminal, said second terminal comprising an adjustable gain amplifier and a demodulator, means for applying the received sideband to the input of said amplifier, means for applying the signals appearing in the output of said amplifier to the input of said demodulator, a band-pass filter tuned to said first frequency connected to the output of said demodulator, means for modulating the amplified signal which corresponds to said first signal with the signal passed by said band-pass filter to derive a carrier wave of said second frequency, means for applying said carrier wave to said demodulator to demodulate said sideband, and means for utilizing the signal passed by said band-pass filter to adjust the gain of said amplifier.

6. In a communication system comprising first and second carrier terminals interconnected by a transmission medium which tends to introduce frequency errors in signals transmitted therethrough, means at said first terminal for generating a first signal of a first frequency, a source of input signals, means at said first terminal for amplitude modulating a carrier wave of a second frequency with said input signals and with said first signal and for suppressing the carrier frequency, means for transmitting at least one of the sidebands of said modulated carrier wave through said transmission medium to said second terminal, said second terminal comprising an adjustable gain amplifier and a demodulator, means for applying the received sideband to the input of said amplifier, means for applying the signals appearing in the output of said amplifier to the input of said demodulator, a band-pass filter tuned to said first frequency connected to the output of said demodulator, means for modulating the amplified signal which corresponds to said first signal with the signal passed by said filter to derive a carrier wave having a frequency equal to said second frequency plus the frequency error introduced in the signal which corresponds to said first signal, means for applying said carrier wave to said demodulator to demodulate the received sideband, and means for utilizing the signal passed by said filter to adjust the gain of said amplifier.

References Cited in the file of this patent

UNITED STATES PATENTS

| | | |
|---|---|---|
| 2,212,808 | Cooley | Aug. 27, 1940 |
| 2,634,334 | Kalb | Apr. 7, 1953 |
| 2,699,494 | Albright | Jan. 11, 1955 |
| 2,724,742 | Chesnut | Nov. 22, 1955 |